United States Patent [19]

Bentzen-Bilkvist

[11] 4,127,307
[45] * Nov. 28, 1978

[54] AERATING BARGE UNLOADING SYSTEM

[75] Inventor: Ib Bentzen-Bilkvist, Ann Arbor, Mich.

[73] Assignee: Dundee Cement Company, Dundee, Mich.

[*] Notice: The portion of the term of this patent subsequent to Apr. 25, 1995, has been disclaimed.

[21] Appl. No.: 861,154

[22] Filed: Dec. 16, 1977

Related U.S. Application Data

[62] Division of Ser. No. 709,846, Jul. 29, 1976, Pat. No. 4,085,975.

[51] Int. Cl.² .............................................. B65G 53/28
[52] U.S. Cl. ......................................... 302/23; 302/59
[58] Field of Search ...................... 302/21, 23, 53, 59, 302/29; 222/195; 366/139

[56] References Cited

U.S. PATENT DOCUMENTS

| 3,373,883 | 3/1968 | Ostberg et al. | 302/21 |
| 3,489,464 | 1/1970 | Delfs | 302/59 |

FOREIGN PATENT DOCUMENTS

| 1,277,120 | 9/1968 | Fed. Rep. of Germany | 302/23 |
| 1,343,417 | 1/1974 | United Kingdom | 222/195 |
| 401,611 | 2/1974 | U.S.S.R. | 302/59 |

Primary Examiner—Evon C. Blunk
Assistant Examiner—Jeffrey V. Nase
Attorney, Agent, or Firm—Cullen, Sloman, Cantor, Grauer, Scott & Rutherford

[57] ABSTRACT

An unloading system for transferring dry bulk particulate material from a first container, such as a barge, into a pressure vessel, and thereafter into a storage container, all transferring being accomplished with vacuum and pressure equipment, and with the particulate material being aerated as it is transferred into the pressure vessel.

4 Claims, 3 Drawing Figures

AERATING BARGE UNLOADING SYSTEM

This is a division of application Ser. No. 709,846, filed July 29, 1976, now U.S. Pat. No. 1,085,975.

BACKGROUND OF THE INVENTION

This invention relates to a barge unloading system and more particularly to an improvement over the barge unloading system of U.S. Pat. No. 3,373,883, assigned to the assignee of the present invention. More specifically, the present invention relates to an improvement in a barge unloading system for unloading dry, bulk particulate material from a barge or other container into an intermediate holding container or pressure vessel, commonly called a reloader, and thereafter into a storage container such as a silo.

In the handling of dry, bulk particulate material such as cement powder, grain, fertilizer or the like it is known that such material may be fluidized when mixed with a pressurized gas such as air and, thereafter, the fluidized material may be easily conveyed as if it were a fluid.

The prior patent assigned to Dundee Cement Company and referred to above discloses a system for unloading a barge by a vacuum technique, with the contents being temporarily stored in a pressure vessel or reloader and thereafter blowing the particulate material from the holding tank into a more permanent storage container such as a silo. As disclosed in said patent, a plurality of reloaders are provided and while one reloader is being loaded with particulate material from the barge, the other reloader is being emptied by transferring the particulate material into the silo.

In the use of such a system, it has been noted that it takes approximately three times as long to empty the reloader as it takes to initially load it. I have discovered that the cause of this problem is that when the particulate material is loaded into the reloader, the particulate material is compacted or compressed by virtue of the vacuum system.

Thus the present invention is directed to an improved unloading system which substantially reduces if not eliminates the problem of compacting of the dry particulate material and thus substantially reduces the time necessary to unload the reloader without any substantial decrease in its capacity.

SUMMARY OF THE INVENTION

The present invention is directed to an improved unloading system for transferring dry, bulk particulate material from a barge into a reloader or pressure vessel and thereafter into a silo with vacuum and pressure equipment to fluidize the particulate material and with the particulate material being aerated as it fills the pressure vessel.

The aeration of the particulate material increases the flow rate of the particulate material as it is being transferred from the pressure vessel or reloader to the silo without any substantial decrease in the capacity of the pressure vessel.

BRIEF DESCRIPTION OF THE DRAWINGS

The various objects and advantages of the present invention will become more apparent upon reading the following detailed description taken in conjunction with the drawings.

In the drawings, wherein like reference numerals identify corresponding components.

DETAILED DESCRIPTION OF THE INVENTION

Figure 1:
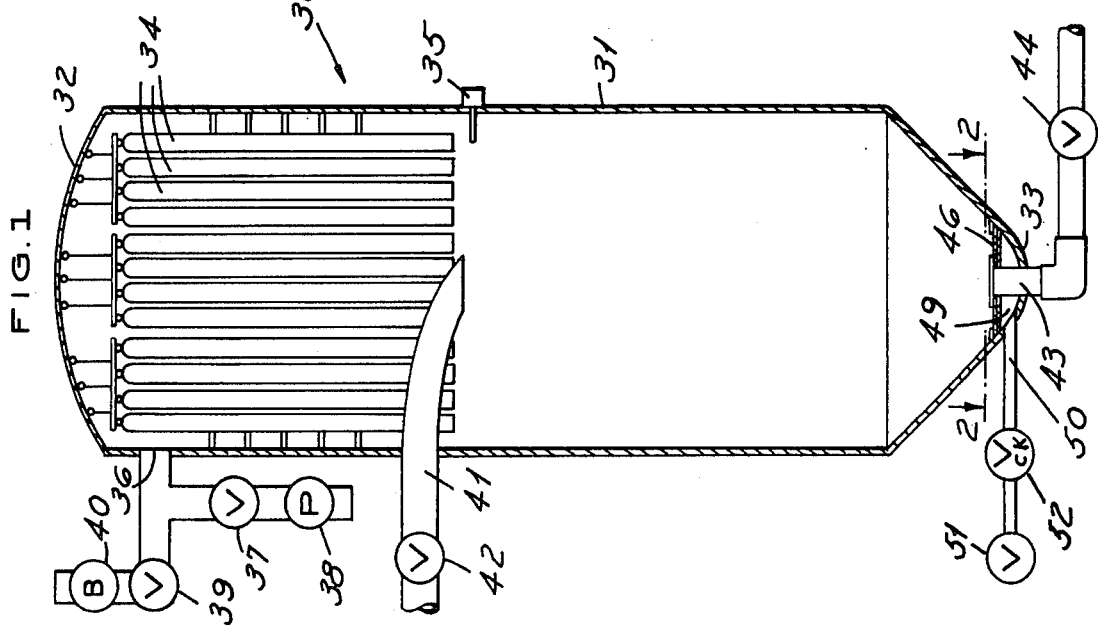
FIG. 1 is a sectional side elevation view of the pressure vessel or reloader according to the principles of the present invention.

Illustrated in FIG. 1 is a pressure vessel 30 utilized as a reloader or intermediate container into which dry particulate bulk material is transferred from a barge. The particulate material is thereafter transferred from the reloader 30 into a silo or other relatively permanent storage vessel.

The pressure vessel or reloader 30 is a hollow tank of generally circular cross section having a wall 31 terminating at one end in an integral domed top 32 and terminating at the other end in an integral conical bottom 33.

The upper portion of the reloader includes a plurality of filter bags 34 which serve as dust collectors and adjacent the bottom of these filter bags there is provided a level detector 35 which provides a signal when the particulate material reaches the height of the level detector. The provision of the air bags and level detector are now conventional in this type of system.

The reloader or pressure vessel, which is made of metal, includes a first upper inlet port 36 connected through a first valve 37 to a vacuum pump 38. The air inlet port 36 is also connected by a second valve 39 to a source of compressed air such as a blower 40.

Substantially intermediate the top and bottom of the reloader 30 an inlet port 41 is provided which port is opened or closed by valve 42. Dry bulk particulate material is introduced into the vessel 30 through port 41 as will be explained in greater detail.

At the conical bottom 33 of the reloader an outlet port 43 is provided along with its associated valve 44.

Slightly above the conical bottom 33 of the reloader an aeration pad 46 is provided. The aeration pad is generally donut shaped providing an open central portion in communication with the outlet port 43. The circumference of the aeration pad is configured to conform to the interior surface of the conical bottom of the holding tank and thus is circular. The aeration pad may be made of a material such as canvas or any other porous material and is supported on a perforated steel plate 47. A plenum chamber 49 is defined as the conical interior of the reloader below the plate 47.

An air inlet port 50 is provided at the conical bottom 33 of the reloader beneath the level of the aeration pad 46. The air inlet port may be opened by a valve 51 and a check valve or one way valve 52 is provided intermediate valve 51 and the reloader.

The operation of the barge unloading system will now be explained. Initially, with the reloader clean and empty, all valves are closed, except valve 37 and valve 42 and the vacuum pump 38 is operated to create a vacuum i.e., suction or reduced pressure in the pressure vessel, and the dry bulk particulate material such as cement powder is sucked through the material inlet port 41 and into the pressure vessel.

Figure 3:
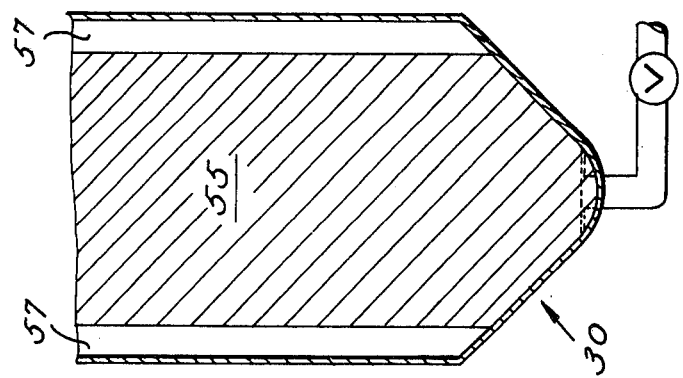
FIG. 3 is a partial sectional view illustrating the problem of compression of the particulate material according to the prior art techniques.
Figure 2:
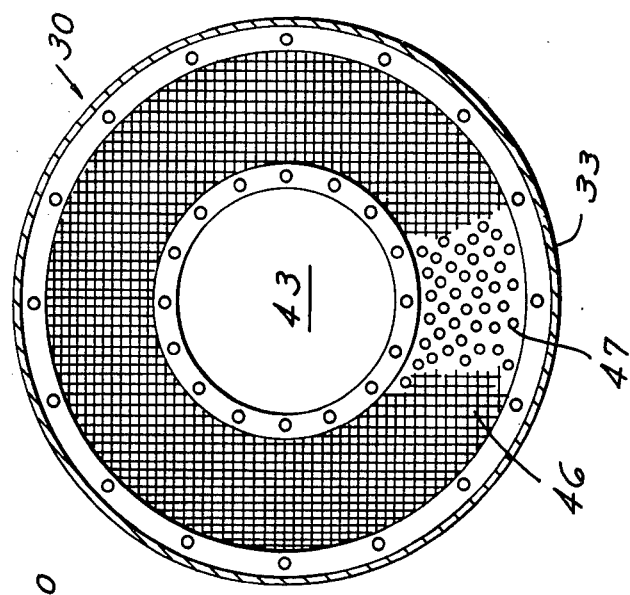
FIG. 2 is a cross sectional view as seen in the plane of arrows 2—2 of FIG. 1 to an enlarged scale.

At this point it would be beneficial to understand the prior art problem and the solution presented by the present invention. FIG. 3 illustrates a reloader 30 into which particulate material 55 is transferred according to prior art techniques. Air, of course, is sucked up with the material 55, at the barge, to fluidize the material 55. As the particulate material 55 enters the reloader, it is compressed or compacted because of the vacuum i.e., suction or reduced pressure in the tank and takes a shape which conforms to the interior of the reloader but spaced apart inwardly therefrom to provide an air space 57 between the particulate material and the wall. This space 57 is filled with the air which was utilized as a fluidizing medium when the particulate material was transferred initially from the barge into the reloader.

As can be seen from FIG. 3, the air which is utilized as a fluidizing medium is in the form of a cylindrical column, and hence is not usable as a fluidizing medium for emptying the particulate material or cement powder out of the reloader.

Referring back to FIG. 1, when valve 42 is opened to permit the cement powder to fill the reloader the present invention contemplates the opening of valve 51. Valve 51, being open, serves as a bleeder and ambient air is pulled through valve 51, past check valve 52 and through inlet port 50 into the reloader. The ambient air, of course, is pulled in through the port 50 by virtue of the vacuum i.e., suction or reduced pressure inside the reloader.

The ambient air coming in through the port 50 enters the plenum 49 and is dispersed through the aeration pad 46 and mixes with the incoming bulk particulate material. The diameter of inlet port 50 is sufficiently small, relative to the diameter of inlet port 41, so that only enough air bleeds into the pressure vessel 30 to provide a homogenous mixture of air and particulate material. Also, the quantity of air bled into the tank may be controlled with valve 51. Thus there is no cylindrical column of air, as contrasted with FIG. 3, and hence the particulate material is not compacted or compressed in the reloader.

Thus, according to the principles of the present invention, a homogenous mixture of air and bulk material is provided in the reloader. However, the capacity of the reloader for particulate material is not substantially reduced by the present invention because the diameter of the inlet port 50 is relatively small, and in addition, the fluidizing air flowing through port 41 is also dispersed through the particulate material.

Thereafter, valves 42 and 37 are closed, valves 39 and 44 opened, and the blower 40 actuated to force the particulate material through port 43 and valve 44 and into a storage silo. The pressure, of course, also closes check valve 52.

Although the filter bags do not form a part of the present inventive concept, their use will now be explained. It is important that the air being pulled through the vacuum pump 38 be substantially dust free. Of course there is quite a bit of dust as part of the cement powder. It is for this purpose that the filter bags are provided. During the filling of the reloader 30, dust is collected on the exterior of these elongated cylindrically cross shaped filter bags. This prevents the dust from entering the vacuum pump 38. Then, during the discharge cycle when the cement is transferred from the reloader 30 to the silo, air from the blower 40 passes over the filter bags and causes any dust collected thereon to fall into the bottom portion of the reloader and thereafter to exit through the port 43.

The foregoing is a complete description of the preferred embodiment of the present invention. Various changes may, of course, be made without departing from the spirit and scope of the present invention. The present invention, therefore, should be limited only by the following claims:

What is claimed is:

1. In a system for unloading dry bulk particulate material by vacuum from a barge or the like into a pressure vessel at a first entrance port and then by emptying said material by positive fluid pressure from the pressure vessel into a storage container such as a silo, the improvement comprising:

means for aerating said dry material in said vessel simultaneously with the introduction of said dry material into said pressure vessel;

said aerating means including a second entrance port and check valve at said second entrance port which check valve opens to ambient air for bleeding the ambient air directly into the pressure vessel only when the vacuum inside the vessel is lower than the ambient air pressure outside the vessel;

said aerating means is for providing a homogenous mixture of air and dry material within said pressure vessel.

2. The system as defined in claim 1 wherein said aerating means includes an aeration pad to disperse air into said pressure vessel.

3. For use in a dry bulk particulate material transporting system of the type having a pressure vessel to be initially evacuated and then filled with dry bulk particulate material from a first port and thereafter emptied under positive pressure, through a second port, said pressure vessel having a cylindrical body, a domed top and a conical bottom, the improvement comprising:

an additional inlet port in said pressure vessel for introducing ambient air directly into said pressure vessel simultaneously with the filling of the dry bulk particulate material; and means for aerating said dry bulk particulate material during filling of said vessel;

said aerating means including;

check valve means connected to said additional inlet port to prevent the introduction of ambient air through said additional inlet port when the pressure in said vessel is the same as or exceeds the ambient air pressure outside said additional inlet port;

whereby the introduction of ambient air through said check valve and said additional inlet port provides a homogenous mixture of air and dry bulk particulate material within said pressure vessel.

4. The invention as defined in claim 3 and further including a porous pad substantially covering the conical bottom of said pressure vessel, said air from said additional inlet port passing through said porous pad to be dispersed through said pressure vessel and mixed with said dry bulk particulate material.

* * * * *

UNITED STATES PATENT OFFICE
CERTIFICATE OF CORRECTION

Patent No. 4,127,307     Dated November 28, 1978

Inventor(s) Ib Bentzen-Bilkvist

It is certified that error appears in the above-identified patent and that said Letters Patent are hereby corrected as shown below:

Column 1, line 4,
"1,085,975" should read -- 4,085,975 --.

Signed and Sealed this

Tenth Day of April 1979

[SEAL]

Attest:

RUTH C. MASON
Attesting Officer

DONALD W. BANNER
Commissioner of Patents and Trademarks